United States Patent [19]
Kotani et al.

[11] Patent Number: 5,969,029
[45] Date of Patent: Oct. 19, 1999

[54] PROCESS FOR PRODUCING A GAS BARRIER RESIN COMPOSITION

[75] Inventors: Kozo Kotani, Toyonaka; Toshio Kawakita; Taiichi Kawakita, both of Ibaraki; Toshiya Kuroda, Takatsuki, all of Japan

[73] Assignee: Sumitomo Chemical Company, Limited, Osaka, Japan

[21] Appl. No.: 08/951,303

[22] Filed: Oct. 16, 1997

Related U.S. Application Data

[60] Division of application No. 08/410,380, Apr. 4, 1995, Pat. No. 5,700,560, which is a continuation-in-part of application No. 08/384,798, Feb. 6, 1995, abandoned, which is a continuation of application No. 08/097,889, Jul. 28, 1993, abandoned.

[30] Foreign Application Priority Data

Jul. 29, 1992 [JP] Japan ................................. 4-202339

[51] Int. Cl.$^6$ ..................................................... C08K 3/34
[52] U.S. Cl. ............................................ 524/447; 524/443
[58] Field of Search ..................................... 524/443, 447

[56] References Cited

U.S. PATENT DOCUMENTS

| | | |
|---|---|---|
| 4,528,235 | 7/1985 | Sacks et al. . |
| 4,818,782 | 4/1989 | Bissot . |
| 4,983,432 | 1/1991 | Bissot . |
| 5,019,446 | 5/1991 | Bunnell, Sr. . |
| 5,106,890 | 4/1992 | Maruhashi et al. . |
| 5,244,729 | 9/1993 | Harrison et al. . |
| 5,385,776 | 1/1995 | Maxfield ................................. 428/297 |
| 5,747,560 | 5/1998 | Christiani ................................. 523/209 |

FOREIGN PATENT DOCUMENTS

| | | |
|---|---|---|
| A2-295517 | 12/1988 | European Pat. Off. . |
| A1-309095 | 3/1989 | European Pat. Off. . |
| A1-459472 | 12/1991 | European Pat. Off. . |
| 1 694349 | 11/1970 | Germany . |
| A-1-10373 | 4/1984 | Japan . |
| A-59-075953 | 4/1984 | Japan . |
| A-62-148532 | 7/1987 | Japan . |
| A-4-178459 | 6/1988 | Japan . |
| A-63-301245 | 12/1988 | Japan . |
| A-1-043554 | 2/1989 | Japan . |
| A-63-132952 | 6/1989 | Japan . |
| A-1-313536 | 12/1989 | Japan . |
| A-03-093542 | 4/1991 | Japan . |
| A-4-80259 | 3/1992 | Japan . |
| 1136350 | of 0000 | United Kingdom . |
| WO 90/05761 | 5/1990 | WIPO . |

OTHER PUBLICATIONS

Taiwan Patent Application No. 82105767, The Official Acftion dated Oct. 27, 1995.

*Primary Examiner*—Paul R. Michl
*Attorney, Agent, or Firm*—Pillsbury Madison & Sutro LLP

[57] ABSTRACT

A gas barrier resin composition or its film having very high level gas barrier and moisture barrier properties, which includes at least a high hydrogen-bonding resin and a non-film-forming inorganic laminar compound having a particle size of 5 $\mu$m and an aspect ratio of 50–5,000. The resin composition or its film can be produced by dispersing a non-film-forming inorganic laminar compound in a high hydrogen-bonding resin or resin solution in such a state that the non-film-forming inorganic laminar compound is swollen or cloven with a solvent, and removing the solvent from the dispersion, if necessary in the form of a film, while maintaining the state.

4 Claims, 7 Drawing Sheets

$2\theta = 3.475$
$D = 25.073 Å$

KUNIPIA F / PVA 117H = 3 / 7

$2\theta = 7.266$
$D = 12.156 Å$

KUNIPIA F

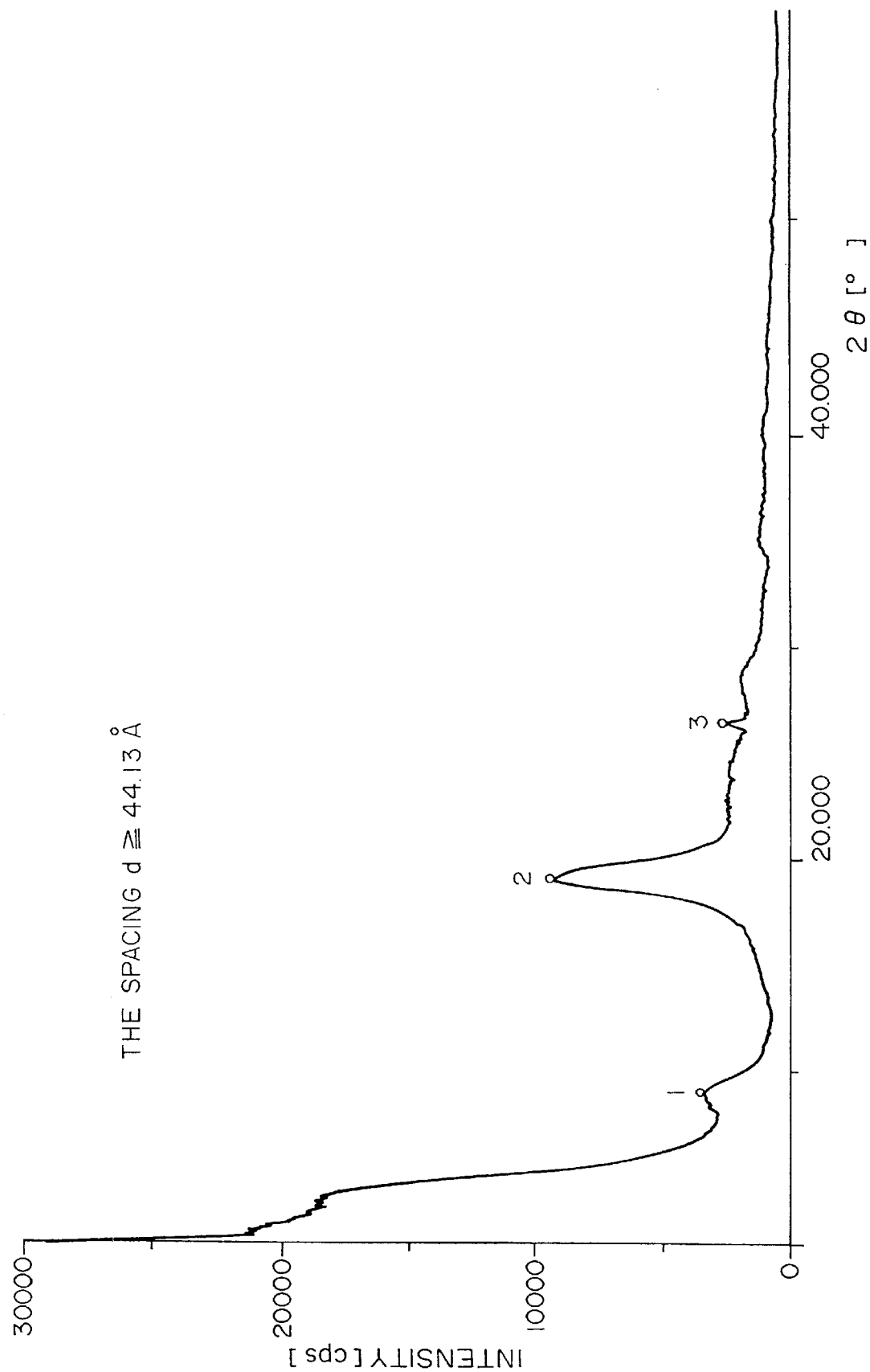

PROCESS FOR PRODUCING A GAS BARRIER RESIN COMPOSITION

CROSS-REFERENCES TO RELATED APPLICATIONS

This is a division of application Ser. No. 08/416,380, filed Apr. 4, 1995, 5,700,560, which is a Continuation-in-part of application Ser. No. 08/384,798, filed Feb. 6, 1995, abandoned, which is a Continuation of application Ser. No. 08/097,889, filed Jul. 28, 1993, now abandoned.

BACKGROUND OF THE INVENTION

1. Field of the Invention

This invention relates to a resin composition, film or laminate excellent in gas barrier properties and to a process for producing the same.

2. Description of the Related Art

Many functions are required for packaging, including adequate gas barrier properties for protecting the package contents. Gas barrier properties are important properties which affect the preservability of foods. Change in distributive systems, diversification of packaging techniques, additive regulations and change in taste increase more and more the necessity for adequate gas barrier properties. However, the gas barrier properties have been weak points of general plastics.

The food-deteriorating factors are oxygen, light, heat, water and the like, and in particular, oxygen is a serious factor. Gas barrier materials are indispensable for effectively intercepting oxygen and simultaneously for controlling the deterioration of foods such as gas-filling, vacuum packaging and the like. Since the barrier materials have a barrier function to not only oxygen gas but also other various gases, organic solvent vapors, fragrance and the like, they can be used for anticorrosion, deodorization and antisublimation and have been utilized in many fields of foods, cosmetics, agricultural chemicals, pharmaceuticals and the like such as confectionery, bonito pack, retort pouch, mineral water container and the like.

Of films consisting of a thermoplastic resin, oriented films of polypropylene, polyester, polyamide or the like have excellent mechanical properties, heat resistance, transparency and the like and are widely used as packaging materials. However, when these films are used for packaging foods, they are unsatisfactory in barrier properties to oxygen and other gases, and therefore, they tend to cause such various problems insofar as their contents become deteriorated by oxidative degradation or with aerobic bacteria, fragrant components permeate the films to lose the taste of the contents, and the moisture in the atmosphere wets the contents to make the taste bad. Thus, usually, such a measure is often taken that other film layers having good gas barrier properties are laminated thereto.

Heretofore, various transparent plastic materials having unsatisfactory gas barrier properties have been known and there are, for example, films composed of polyvinyl alcohol, ethylene-vinyl alcohol copolymer or polyvinylidene dichloride resin. However, these plastic materials are oxygen-permeable in such a degree that the amount of oxygen permeated cannot be neglected while a metal or glass material to be used in canning or bottling has an oxygen permeability of substantially zero.

Another method for imparting gas barrier properties is a method of dispersing an inorganic material in the flat form in a resin. For example, Japanese Patent Application Kokai No. 62-148,532 describes a production method which comprises coating on a releasable substrate a coating composition consisting of 100 parts by weight of a polyurethane resin solution having a concentration of 30% in 1,6-hexanepolycarbonate diol, 25 parts by weight of mica powder and 60 parts by weight of dimethyl-formamide, drying the same and then releasing it from the substrate.

Japanese Patent Application Kokai No. 64-043,554 describes a method of obtaining a film which comprises adding mica particles having an average length of 7 $\mu$m and an aspect ratio of 140 to a methanolic aqueous solution of an ethylene-vinyl alcohol copolymer, pouring the solution in a cold water to form a precipitate, removing the precipitate by filtration, drying it to form pellets and then forming the pellets into a film.

Further, Japanese Patent Application Kokai No. 3-93,542 describes a method which comprises coating a biaxially oriented polyethylene terephthalate (OPET) film with a coating composition consisting of a silyl group-containing modified polyvinyl alcohol and synthetic hectorite at a weight ratio of 50:50, drying the same and then heat-treating it at 130–150° C.

However, the films obtained by these techniques are still not sufficient in gas barrier properties and cannot always be said to be satisfactory.

SUMMARY OF THE INVENTION

In order to solve the above-mentioned problems, the present inventors have made extensive research to find that a resin composition consisting of a high hydrogen-bonding resin and a non-film-forming inorganic laminar compound can be given excellent gas barrier properties by increasing the aspect ratio of the non-film-forming inorganic laminar compound.

An object of this invention is to provide a gas barrier resin composition or its molded article including a film having high level gas barrier and moisture barrier properties.

Another object of this invention is to provide a process for producing the gas barrier resin composition or its molded article including a film.

Other objects and advantages of this invention will become apparent from the following description.

According to this invention, there is provided a resin composition or its film or laminate comprising a high hydrogen-bonding resin and a non-film-forming inorganic laminar compound having a particle size of 5 $\mu$m or less and an aspect ratio of 50 to 5,000.

This invention further provides a process for producing the above resin composition or its film, which comprises dispersing a non-film-forming inorganic laminar compound in a high hydrogen-bonding resin or resin solution in the state that the non-film-forming inorganic laminar compound is swollen or cloven with a solvent, and removing the solvent from the dispersion, if necessary in the form of a film, while keeping said state.

BRIEF DESCRIPTION OF THE DRAWINGS

In FIG. 1, 11 indicates the peak which corresponds to "the unit thickness a" of the inorganic laminar compound.

In FIG. 2, 21 indicates the peak which corresponds to "the spacing d" of the resin composition, 22 indicates a position of the peak which corresponds to "the unit thickness a" of the inorganic laminar compound, 23 indicates the base line, k value, when it is converted into a length, and is not less than the width of one chain of the resin, and $\theta_d$ is a diffraction angle which corresponds to the sum of the unit thickness a and the width of one chain of the resin.

In FIG. 3, the peak which corresponds to the spacing d is defined by the peak of the area from which the part below the base line at the angle range of lower than $2\theta_d$ is removed. 31 indicates the width of one chain of the resin, 32 indicates the base line, and 33 indicates the peak which corresponds to "the unit thickness a" of the inorganic laminar compound.

FIG. 9 is a graph showing X-ray diffraction peaks of the composition having the spacing d of 44.13 Å or more (which is a pattern in FIG. 3 as mentioned above). However, in this case a clear shoulder, as compared with FIG. 8, due to the peak observed in lower angle range than the diffraction peak put a mark 1. is observed.

DESCRIPTION OF THE PREFERRED EMBODIMENTS

Figure 1:
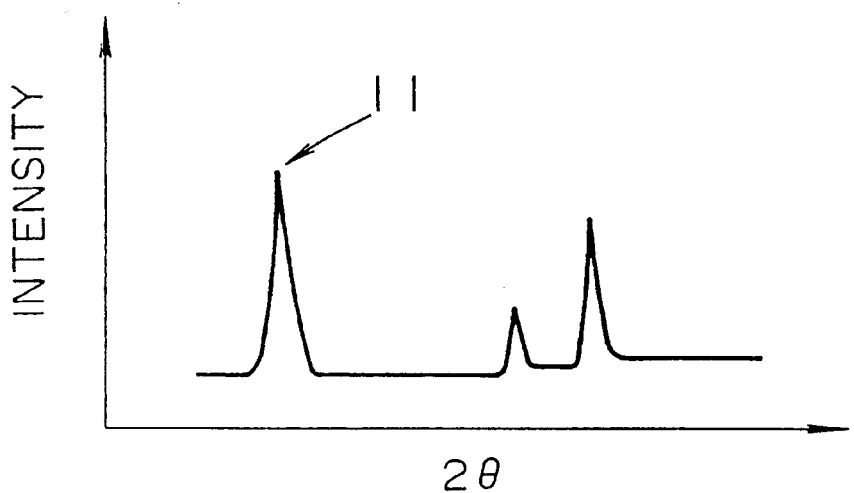
FIG. 1 is a graph typically showing a relationship between X-ray diffraction peaks of an inorganic laminar compound and "the unit thickness a" of the inorganic laminar compound.

The non-film-forming inorganic laminar compound used in this invention is an inorganic compound having a laminar structure formed by unit crystal layers being piled up on one another, and any inorganic compound may be used so long as it has a particle size of 5 μm or less and an aspect ratio of 50–5,000. In view of the gas barrier properties, the aspect ratio is preferably 200–3,000. If the aspect ratio is less than 50, the gas barrier properties are not sufficiently exhibited, and if the aspect ratio is more than 5,000, such an inorganic compound is technically difficult to produce and is too expensive.

The term "non-film-forming" used in the present invention means that the inorganic laminar compound exhibits insufficient gas barrier properties when subject to such procces steps as blanching of a film, exfoliation of part of a film or formation of many piercing holes in a film at the time of film-forming.

In view of easy dispersion of the inorganic laminar compound in a resin, the non-film-forming inorganic laminar compound used in the present invention preferably has 500 cc·μm/m²/day/atm or more of a product of a coating film thickness and oxygen-permeability measured for a film obtained by film-forming under the conditions shown in Comparative Examples 27–29.

When the particle size is 3 μm or less, the transparency is higher and such an inorganic compound is preferred.

Specific examples of the non-film-forming inorganic laminar compound include graphite, phosphoric acid salt derivative type compounds (e.g. zirconium phosphate compounds), chalcogenaides [the IV Group metal (Ti, Zr, Hf) dichalcogenides, the V Group metal (V, Nb, Ta) dichalcogenides and the VI Group metal (Mo, W) dichalcogenides which are represented by the formula $MX_2$ wherein X represents chalcogen (Sr Se, Te)], clay minerals and the like.

The measurement of true particle size in a resin composition is very difficult, and therefore, the particle size of the non-film-forming inorganic laminar compound used in this invention is a value determined according to a dynamic light-scattering method in a solvent.

When a non-film-forming inorganic laminar compound sufficiently swollen with the same solvent as used in the dynamic light-scattering method is compounded with a resin, the particle size of the non-film-forming inorganic laminar compound in the resin can be considered to be close to the particle size in a solvent.

The aspect ratio (Z) of the non-film-forming inorganic laminar compound used in this invention is indicated by the relation of Z=L/a in which L is the particle size determined according to the dynamic light-scattering method in a solvent and a is the unit thickness of the non-film-forming inorganic laminar compound (the unit thickness a is a value determined by measurement of the non-film-forming inorganic laminar compound alone according to the powder X-ray diffraction), provided that in Z=L/a, the spacing d determined by the powder X-ray diffraction of the composition is present and satisfies a relation of a<d, in which the value of d−a is required to be greater than the width of one chain of resin in the composition.

Specifically, the unit thickness a is defined by the spacing determined from an angle θ which corresponds to the peak at the lowest angle among the observed diffraction peaks, on a basis of the Bragg's Equation (n·λ=2D·sin θ, n=1, 2, 3 . . . ) as typically shown in FIG. 1 having 2θ as a horizontal axis and an intensity of X-ray diffraction peak as a vertical axis (the details of the powder X-ray diffraction method can be referred to, for example, "Manual for Instrumental Analysis (a)", Edited by Jiro Shiokawa and Published by Kagaku Dojin, Japan, page 69, 1985).

Figure 2:
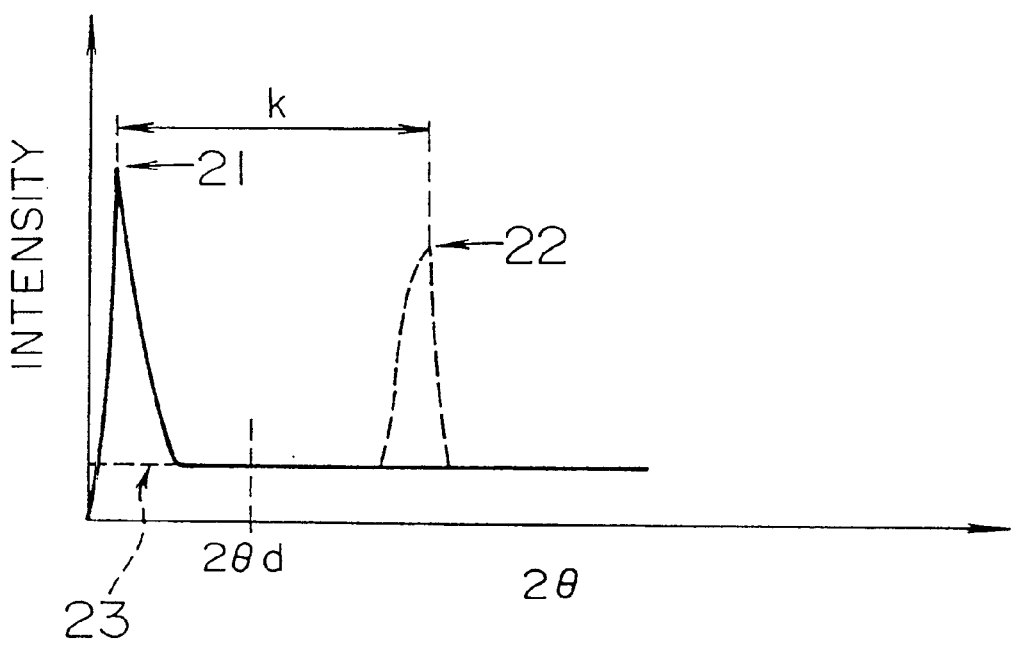
FIG. 2 is a graph typically showing a relationship between X-ray diffraction peaks of a resin composition containing an inorganic laminar compound and "the spacing dd" of the resin composition.
Figure 3:
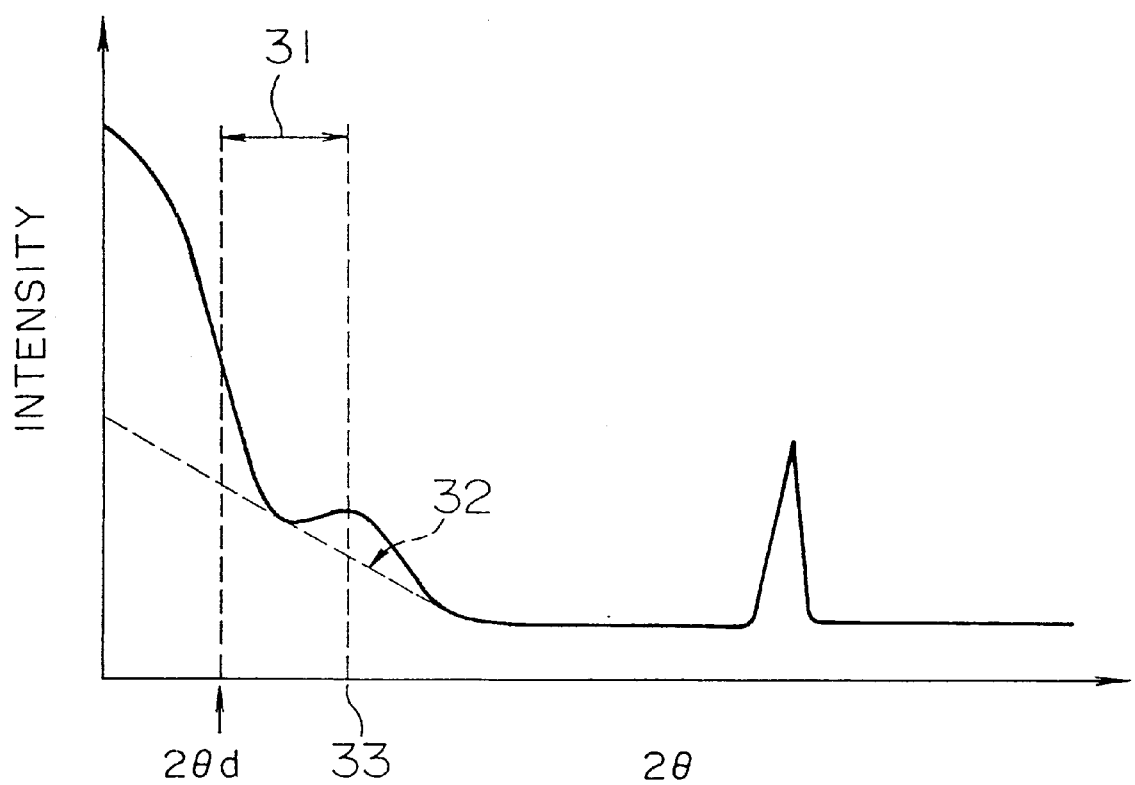
FIG. 3 is a graph typically showing a relationship between X-ray diffraction peaks of a resin composition and "the spacing d" of the resin composition when the detection of the peak which corresponds to the spacing d is disturbed by being overlapped with a halo (or background).
Figure 4:
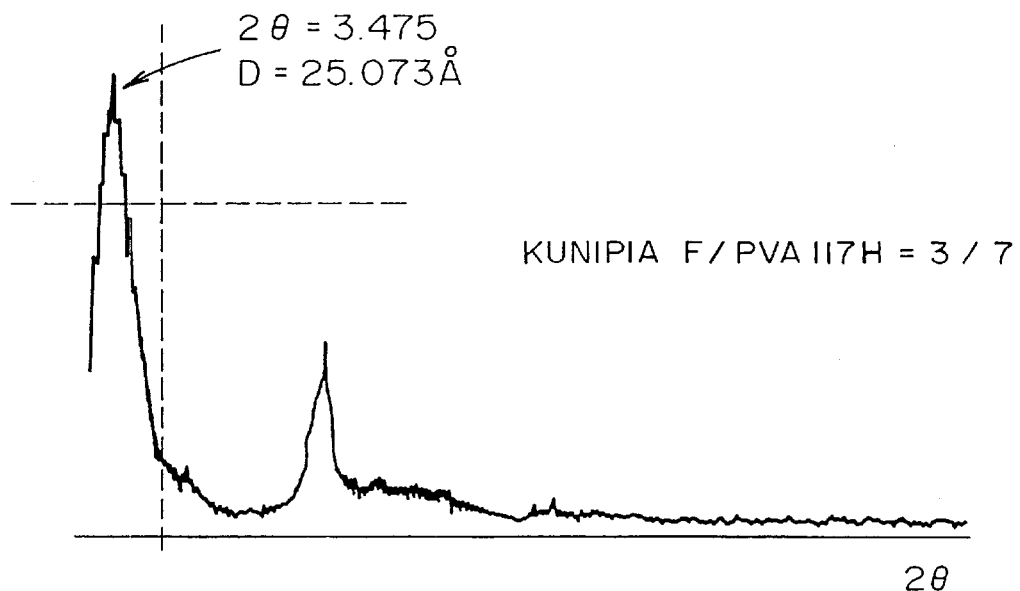
FIG. 4 is a graph showing X-ray diffraction peaks of the composition of polyvinyl alcohol, PVA-117H/Kunipia F used in Examples.
Figure 5:
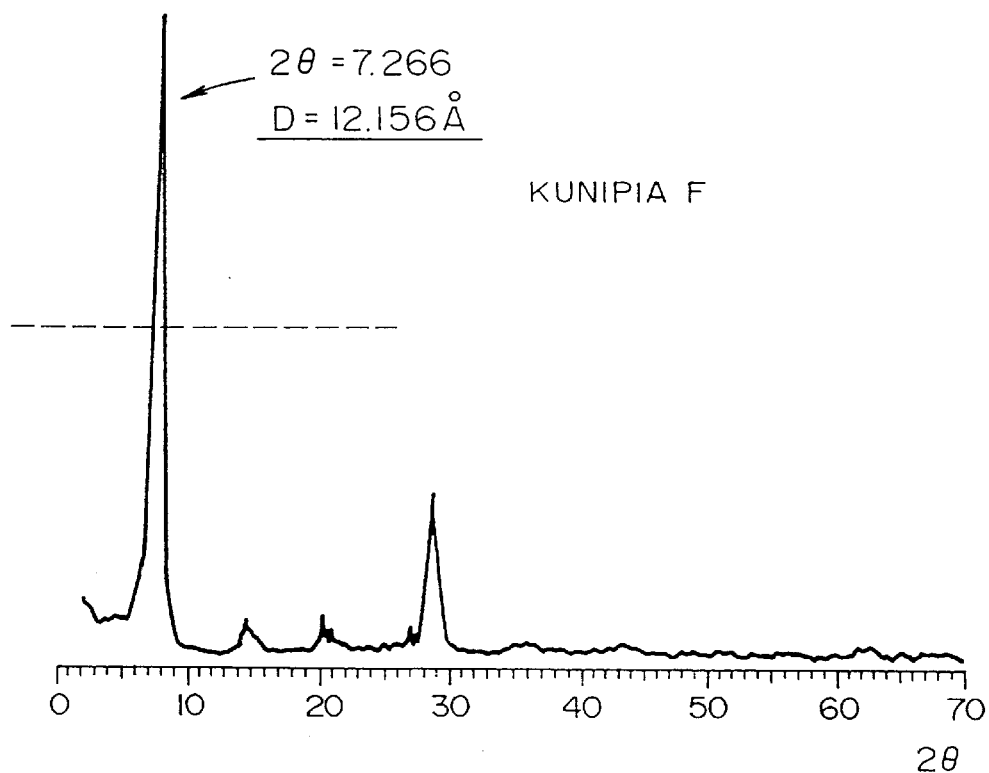
FIG. 5 is a graph showing X-ray diffraction peaks of Kunipia F used in Examples.
Figure 6:
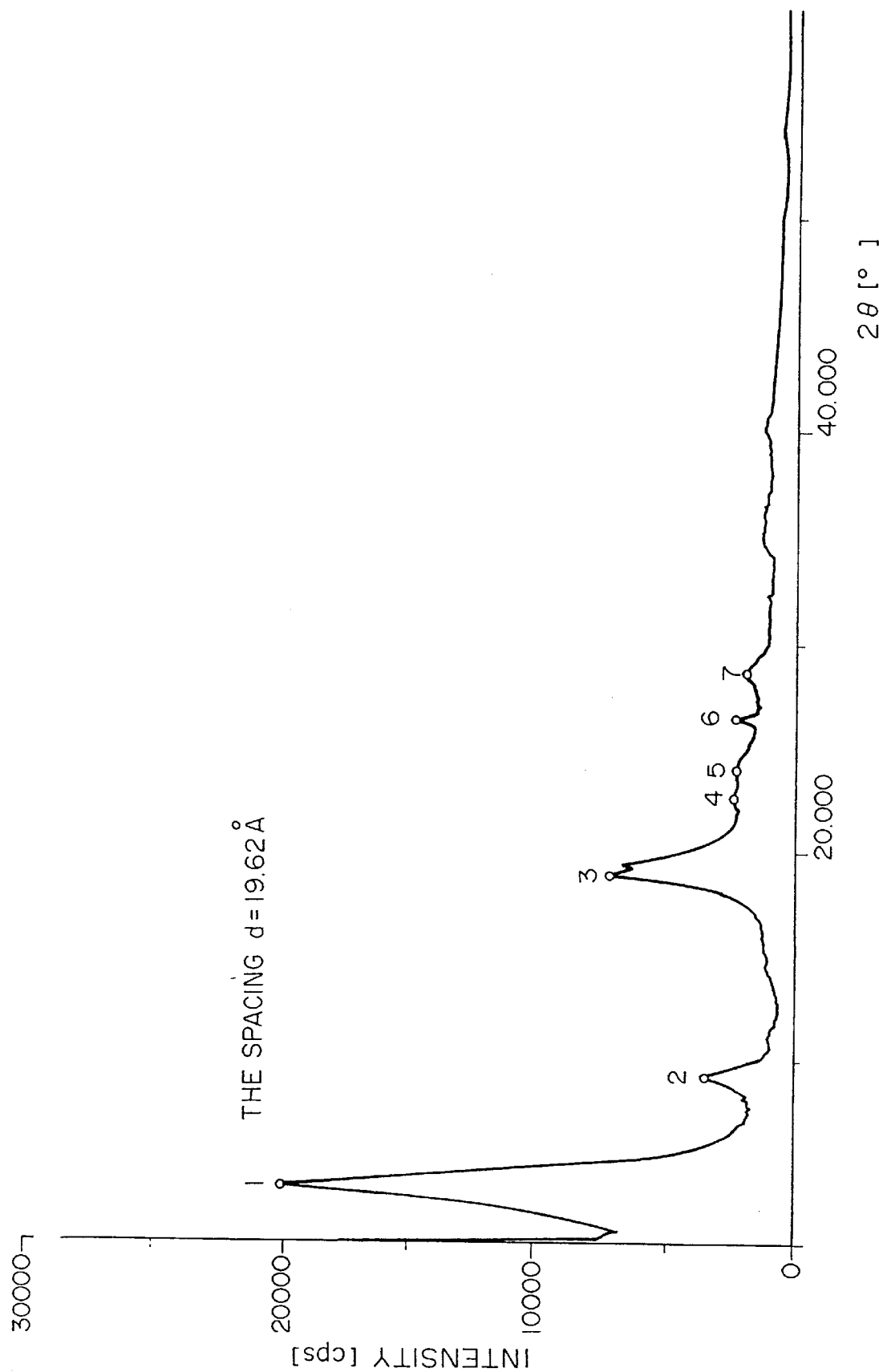
FIG. 6 is a graph showing X-ray diffraction peaks of the composition having the spacing d of 19.62 Å (which is a pattern in FIG. 2 as mentioned above).
Figure 7:
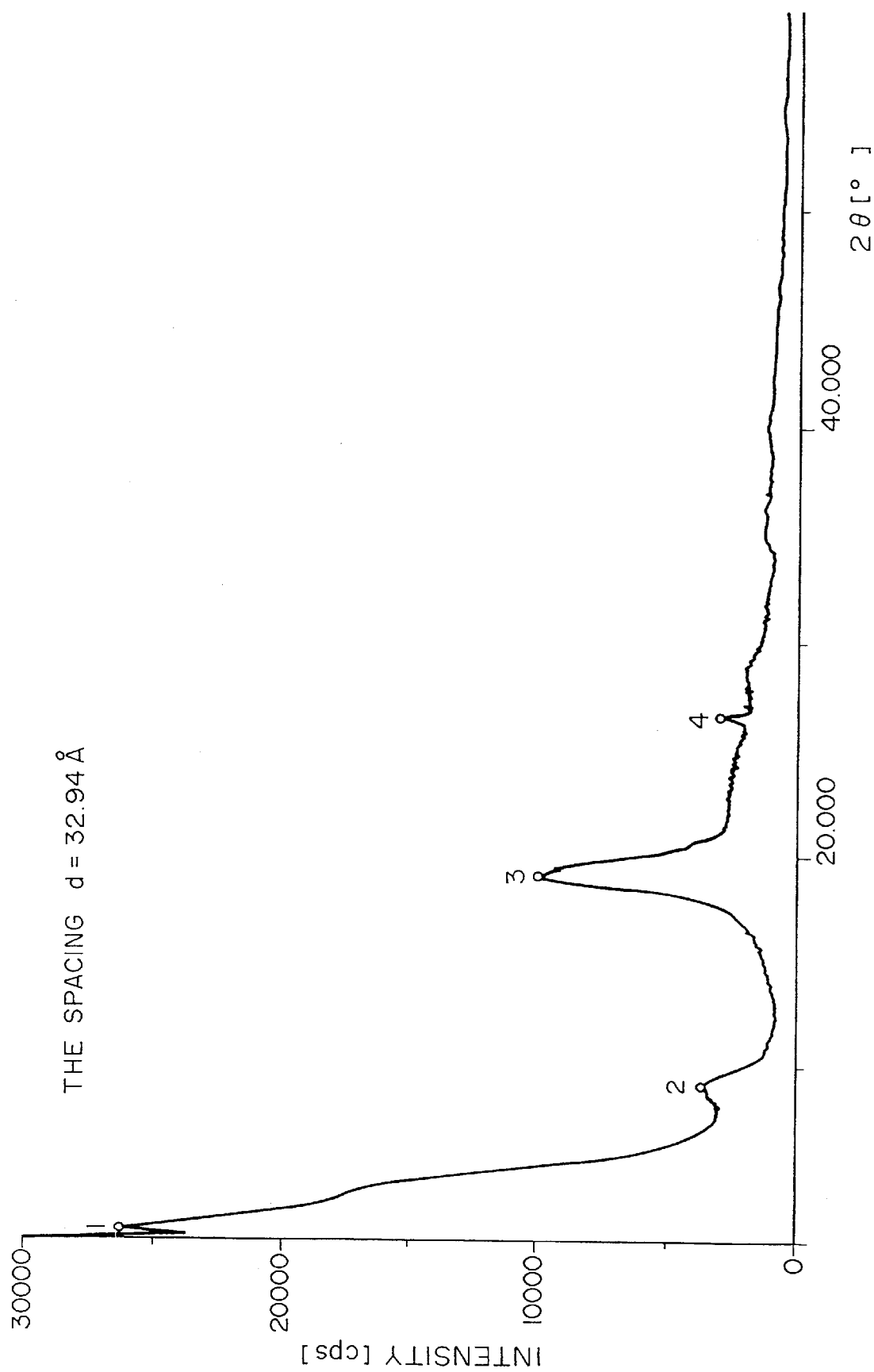
FIG. 7 is a graph showing X-ray diffraction peaks of the composition having the spacing d of 32.94 Å (which is a pattern in FIG. 2 or FIG. 3 as mentioned above).
Figure 8:
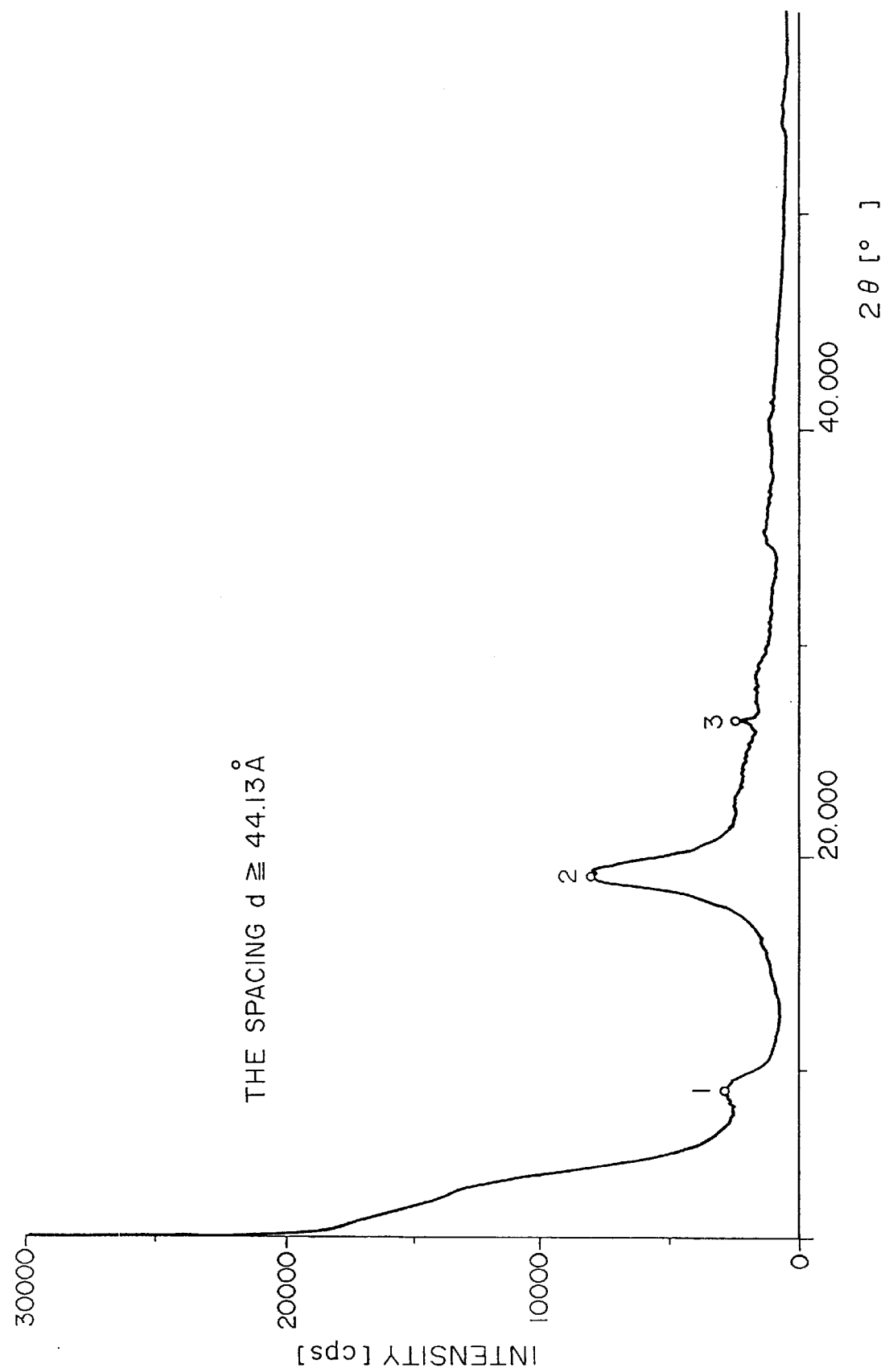
FIG. 8 is a graph showing X-ray diffraction peaks of the composition having the spacing d of 44.13 Å or more (which is a pattern in FIG. 3 as mentioned above).

As typically shown in FIG. 2 having 2θ as a horizontal axis and an intensity of X-ray diffraction peak as a vertical axis, the spacing d (a<d) is a spacing which corresponds to the peak at the lowest angle among the diffraction peaks observed in lower angle (large spacing) range than the diffraction peak which corresponds to the unit thickness a as mentioned above. As typically shown in FIG. 3, when the detection of the peak which corresponds to the spacing d as mentioned above is disturbed by being overlapped with a halo (or background), the peak which corresponds to the spacing d is defined by the peak of the area from which the part below the base line at the angle range of lower than $2\theta_d$ is removed. $\theta_d$ is herein a diffraction angle which corresponds to the sum of the unit thickness a and the width of one chain of the resin (the details of the method for determining the spacing d can be referred to, for example, "Encylopedia of Clay", Edited by Shuichi Iwao et al., Published by Asakura Shoten, Japan, page 35 et seq. and page 271 et seq., 1985).

In this way, "integrated intensity" of the diffraction peak (which corresponds to the spacing d) observed in the powder X-ray diffraction of the resin composition is preferably 2 or more (more preferably, 10 or more) of a relative ratio to the integrated intensity of the base diffraction peak (which corresponds to the unit thickness a).

Z cannot necessarily be said to be the true aspect ratio of the non-film-forming inorganic laminar compound in the resin composition; however, it is considerably reasonable for the following reason:

The aspect ratio of the non-film-forming inorganic laminar compound in the resin composition is very difficult to measure directly. Between the spacing d obtained by the powder X-ray diffraction of the composition and the unit thickness a determined by the powder X-ray diffraction of the non-film-forming inorganic laminar compound, there is a relation of a<d, and when the d−a value is greater than the width of one chain of the resin in the composition, it follows that in the resin composition, the resin is inserted between the layers of the non-film-forming inorganic laminar compound, and hence, it is clear that the thickness of the non-film-forming inorganic laminar compound is the unit thickness a.

"The width of one chain of the resin" can be determined by a simulation calculation etc. (for example, referred to "Introduction of Polymer Science", Published by Kagaku Dojin, Japan, pages 103–110, 1981). That of poly(vinyl alcohol) was determined to be 4 to 5 Å (that of water molecule determined to be 2 to 3 Å).

Also, the measurement of the true particle size in the resin composition is very difficult, and taking the case where the non-film-forming inorganic laminar compound is sufficiently swollen with the same solvent as used in the dynamic light-scattering method and then compounded with the resin, it can be understood that the particle size of the non-film-forming inorganic laminar compound in the resin is considerably close to that in the solvent, provided that the particle size L determined by the dynamic light-scattering method is considered not to exceed the long diameter $L_{max}$, so that the true aspect ratio $L_{max}/a$ cannot theoretically become lower than Z in the definition of the aspect ratio in this invention.

From the above two points, it is considered that the aspect ratio in this invention be relatively high in propriety. In this invention, the aspect ratio and particle size mean the above-defined aspect ratio and particle size, respectively.

The non-film-forming inorganic laminar compound having a large aspect ratio is preferably an inorganic laminar compound which can be swollen or cloven with a solvent.

The degree of "swelling and cleavage" properties to a solvent of the inorganic laminar compound used in the present invention can be determined by the following "swelling and cleavage" tests. The swelling property of the inorganic laminar compound is preferably 5 or more (more preferably, 20 or more). This cleavage property of the inorganic laminar compound is preferably 5 or more (more preferably, 20 or more). In these cases, a solvent having a smaller density than that of the inorganic laminar compound is used as a solvent. When the inorganic laminar compound is natural swellable clay minerals, water is preferably used as the solvent.

[Swelling Test]

2 g of an inorganic laminar compound was slowly added to 100 ml of a solvent (100 ml of a measuring cylinder was used as a container). After leaving to stand at 23° C. for 24 hours, a volume of a dispersed layer of the inorganic laminar compound was measured from the scale of a boundary between the dispersed layer of the inorganic laminar compound and a supernatant liquid. The larger the value of the volume, the higher the swelling property (swellability).

[Cleavage Test]

30 g of an inorganic laminar compound was slowly added to 1500 ml of a solvent and dispersed in the solvent at a peripheral speed of 8.5 m/sec at 23° C. for 90 minutes by the use of a dispersing machine (manufactured by Asada Tekko, trade name: Desper MH-L, a diameter of an impeller blade: 52 mm, a number of agitating: 3100 rpm, a container volume: 3 l, a distance between the bottom of the container and the impeller blade: 28 mm). Thereafter, 100 ml of the dispersed solution was taken and added to a measuring cylinder, left to stand for 60 minutes, and then the volume of the dispersed layer of the inorganic laminar compound was measured from the scale of the boundary between the dispersed layer of the inorganic laminar compound and a supernatant liquid.

Among the inorganic laminar compounds which can be swollen or cloven with a solvent, non-film-forming clay minerals having a swellability are more preferable. The clay minerals are classified into a type of a two-layer structure in which on the upper portion of the tetrahedron layer of silica is present an octahedron layer in which the center metal is aluminum, magnesium or the like, and a type of a three-layer structure in which an octahedron layer in which the center metal is aluminum, magnesium or the like is sandwiched between tetrahedron layers of silica.

The former type includes the kaolinite Group, the antigorite Group and the like. The latter type includes the smectite Group, the vermiculite Group, the mica Group and the like corresponding to the number of cations between the layers.

Specifically, kaolinite, dickite, nacrite, halloysite, antigorite, chrysotile, pyrophyllite, montmorillonite, hectorite, sodium terasililic mica, sodium taeniolite, common mica, margarite, talc, vermiculite, phlogopite, xanthophyllite, chlorite and the like.

The solvent for swelling the non-film-forming inorganic laminar compound is not critical; however, in the case of, for example, natural swellable non-film-forming clay minerals, preferable are water; alcohols such as methanol, ethanol, propanol, isopropanol, ethylene glycol, diethylene glycol and the like; dimethylformamide; dimethylsulfoxide; acetone; and the like. Water and alcohols such as methanol and the like are more preferable.

The high hydrogen-bonding resin used in this invention is not critical and includes, for example, polyvinyl alcohol (PVA), ethylene-vinyl alcohol copolymer (EVOH), polysaccharide, polyacrylic acid and its esters, and the like.

It is preferred that the high hydrogen-bonding resins satisfy the requirement that the weight percentage of hydrogen-bonding group or ionic group per unit weight of the resin falls within the range of 20–60%.

It is more preferred that the high hydrogen-bonding resins satisfy the requirement that the weight percentage of the hydrogen-bonding group or ionic group per unit weight of the resin falls within the range of 30–50%. The hydrogen-bonding group of the high hydrogen-bonding resin includes hydroxyl group, amino group, thiol group, carboxyl group, sulfonic acid group, phosphoric acid group and the like, and the ionic group includes carboxylate group, sulfonate ion group, phosphate ion group, ammonium group, sulfonium group and the like.

Of the hydrogen-bonding groups or ionic groups of the high hydrogen-bonding resins, more preferable are hydroxyl group, amino group, carboxyl group, sulfonic acid group, carboxylate group, sulfonate ion group, ammonium group and the like.

Specific examples of the high hydrogen-bonding resin include, for example, polyvinyl alcohol, ethylene-vinyl alcohol copolymer, the vinyl alcohol fraction of which is 41 mole % or more, polysaccharide such as hydroxymethylcellulose, hydroxyethylcellulose, carboxylmethylcellulose, amylose, amylopectin, pluran, cardran, xanthan, chitin, chitosan, cellulose and the like; polyacrylic acid; polysodium acrylate; polybenzenesulfonic acid; polysodium benzenesulfonate, polyethyleneimine; polyallylamine; its ammonium salt; polyvinyl thiol; polyglycerin; and the like.

More preferable high hydrogen-bonding resins are soluble resins in solvents which can swell and cleave the inorganic laminar compound, such as polyvinyl alcohol and polysaccharide etc.

The term "polyvinyl alcohol" referred to herein means a polymer having a monomer unit of vinyl alcohol as a main component. Such a "polyvinyl alcohol" includes, for example, a polymer obtained by hydrolyzing or ester interchanging (saponifying) the acetate ester portion of a vinyl acetate polymer (exactly, a polymer in which a copolymer of vinyl alcohol and vinyl acetate is formed), and polymers obtained by saponifying a trifluorovinylacetate polymer, a vinyl formate polymer, a vinyl pivalate polymer, a tert-butylvinylether polymer, a trimethylsilylvinylether polymer, and the like (the details of "polyvinyl alcohol" can be referred to, for example, "World of PVA", Edited by the Poval Society and Published by Kobunshi Kankoukai, Japan, 1992 and "Poval", Edited by Nagano et al. and Published by Kobunshi Kankoukai, Japan, 1981). The degree of saponification in polyvinyl alcohol is preferably 70 mole % or more, more preferably 85 mole % or more, particularly preferably 98 mole % or more, that is, so-called perfect saponification. The degree of polymerization of polyvinyl alcohol is preferably 100 to 5,000, more preferably 200 to 3,000.

The term "polysaccharide" used herein means biopolymers which are synthesized by condensation-polymerization of various monosaccharides in a living body, and includes chemically modified biopolymers. The polysaccharides include, for example, cellulose; cellulose derivatives such as hydroxymethylcellulose, hydroxyethylcellulose, carboxymethylcellulose and the like; amylose; amylopectin; pluran; cardran; xanthan; chitin; chitosan and the like.

In this invention, a cross-linking agent for the hydrogen-bonding group may be used for the purpose of improving the barrier properties of the resin after water-resistant environmental test.

The cross-linking agent for hydrogen-bonding group is not critical, and includes, for example, titanium coupling agent, silane coupling agent, melamine coupling agent, epoxy coupling agent, isocyanate coupling agent, copper compound, zirconium-containing compound and the like, and preferable is the zirconium-containing compound.

Specific examples of the zirconium-containing compound include, for example, zirconium halides such as zirconium oxychloride, zirconium hydroxychloride, zirconium tetrachloride, zirconium bromide and the like; zirconium salts with mineral acids such as zirconium sulfate, basic zirconium sulfate, zirconium nitrate and the like; zirconium salts with organic acids such as zirconium formate, zirconium acetate, zirconium propionate, zirconium caprylate, zirconium stearate and the like; zirconium complexes such as ammonium zirconium carbonate, sodium zirconium sulfate, ammonium zirconium acetate, sodium zirconium oxalate, sodium zirconium citrate, ammonium zirconium citrate and the like; etc.

The amount of the cross-linking agent for hydrogen-bonding group added is not particularly limited so long as the ratio (K) of the number of moles (CN) of the cross-linking group of the cross-linking agent to the number of moles (HN) of the hydrogen-bonding group of the high hydrogen-bonding resin (namely, K=CN/HN) falls within the range of 0.001 to 10, and preferably within the range of 0.01 to 1.

The composition ratio (volume ratio) of the non-film-forming inorganic laminar compound to the high hydrogen-bonding resin used in this invention is generally in the range of 5/95–90/10, preferably in the range of 5/95–50/50.

When the volume ratio of the non-film-forming inorganic laminar compound is less than 5/95, the barrier properties are not sufficient, and when it is more than 90/10, the film-formability is not satisfactory.

The volume ratio can be calculated from the weight ratio of the inorganic laminar compound charged to the resin charged expressed by a fraction. Specifically, it can be calculated by dividing the numerator and the denominator of the fraction by the densities of the inorganic laminar compound charged and the resin charged, respectively. Generally, the density of a resin (for example, polyvinyl alcohol) sometimes varies with crystallinity of the resin, however, in the calculation of the volume ratio as mentioned above, it can be calculated, for example, on the assumption that crystallinity of polyvinyl alcohol is 50%.

The method of compounding the non-film-forming inorganic laminar compound with the high hydrogenbonding resin is not critical, and includes, for example, a method which comprises mixing a resin solution with a dispersion formed by previously swelling or cleaving the non-film-forming inorganic laminar compound with a solvent and then removing the solvent; a method which comprises adding a dispersion formed by swelling or cleaving the non-film-forming inorganic laminar compound with a solvent to the resin, and then removing the solvent, a method which comprises adding non-film-forming inorganic laminar compound to a solution dissolving a high hydrogen-bonding resin to form a dispersing solution containing a swollen and cloven non-film-forming inorganic laminar compound and removing a solvent from the solution, and a method which comprises heat-mixing the high hydrogen-bonding resin with the non-film-forming inorganic laminar compound. The former three are preferable since a particularly large aspect ratio is easily obtained.

In the above-mentioned former three methods, heat-ageing at a temperature of 110° C. to 220° C. after the removal of the solvent can enhance the water resistance of a film (the barrier properties after water-resistant environmental test). The ageing time is not critical, and it is necessary that the film temperature reaches at least the desired temperature. For example, in the case of contacting with a heating medium such as using a hot air drier, a period of 1 second to 100 minutes is preferred.

The heat source is not critical, and contact with hot roll, contact with a heating medium such as hot air or oil, heating with an infrared ray, heating with a microwave and other various means can be applied.

The effect of the water resistance referred to herein is remarkably high when the non-film-forming inorganic laminar compound is a non-film-forming clay mineral.

The resin composition of this invention is molded into various forms and then used. The form of the molded article is not critical, and when the molded article is used as a packaging material such as film, sheet, container (e.g. tray, bottle or the like), etc., gas barrier properties are sufficiently exhibited.

The molded article is usually used in the form of a laminate. The substrate of the laminate is not critical, and general substrates such as resin, paper, aluminum foil, wood, woven fabric, non-woven fabric and the like may be used.

The resin to be used as a substrate includes polyolefin resins such as polyethylene (low density and high density), ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer, ionomer resin and the like; polyester resins such as polyethylene terephthalate, polybutylene terephthalate, polyethylene naphthalate and the like; polyamide resins such as nylon-6, nylon-6,6, meta-xylenediamine-adipic acid condensation polymer, polymethyl methacrylimide and the like; acrylic resins such as polymethyl methacrylate and the like; styrene or acrylonitrile resins such as polystyrene, styrene-acrylonitrile copolymer, styrene-acrylonitrile-butadiene copolymer, polyacrylonitrile and the like; hydrophobilized cellulose resins such as cellulose triacetate, cellulose diacetate and the like; halogen-containing resins such as polyvinyl chloride, polyvinylidene dichloride, polyvinylidene difluoride, Teflon and the like; hydrogen-bonding resins such as polyvinyl alcohol, ethylene-vinyl alcohol copolymer, cellulose derivatives and the like; engineering plastic resins such as polycarbonate resin, polysulfone resin, polyethersulfone resin, polyetheretherketone resin and the like; etc.

In the case of laminates in the form of a film, the outer layer is preferably a biaxially oriented polypropylene, polyethylene terephthalate or nylon film, a polyvinylidene dichloride-coated (so-called K-coat) biaxially oriented polypropylene, polyethylene terephthalate or nylon film or the like, and the inner layer is preferably a polyolefin resin film such as polyethylene (low density or high density) film, ethylenepropylene copolymer film, ethylene-butene copolymer film, ethylene-hexene copolymer film, ethylene-octene copolymer film, polypropylene film, ethylene-vinyl acetate copolymer film, ethylene-methyl methacrylate copolymer film or the like in view of good heat-sealability.

The method of laminating the resin composition of this invention to a substrate is not critical. When the substrate is a film or sheet, preferred is a coating method which comprises coating a coating solution of the resin composition on the surface of the substrate, drying the solution and then heat-treating the coated substrate or a method which comprises laminating the film of this invention to a substrate.

The coating method includes direct gravure method; reverse gravure method; microgravure method; roll-coating methods such as two-roll beat coat method, bottom-feeding three-roll reverse coat method and the like; doctor knife method; die coat method; dip coat method; bar coating method and combinations thereof.

T he coating layer thickness may be varied depending upon the kind of substrate and the desired barrier properties, and it is preferably 10 $\mu$m or less, more preferably 1 $\mu$m or less, in terms of dry thickness.

When it is 1$\mu$m or less, the transparency of the laminate is greatly high. The resin composition, laminate, and laminated film of the present invention preferably have a transparency selected in view of convenience. The transparency is preferably 80% or more of the total light transmission at a wavelength of 500 $\mu$m, more preferably 85% or more, particularly preferably 90% or more. Such a transparency can be suitably measured by, for example, a commercially available spectrophotometer (self-spectrophotometer, type 330, manufactured by Hitachi, Ltd.).

There is no lower limit, and the thickness is preferably 1 nm or more, more preferably 10 nm or more, particularly preferably 100 nm or more, in order to obtain effective gas barrier properties.

As far as the effect of this invention is not lost, the resin composition of this invention may contain various additives such as ultraviolet absorber, coloring matter, antioxidant and the like. This invention covers a laminated film and laminate which have at least one layer of the above-mentioned film.

According to this invention, it becomes possible to obtain a gas barrier film having high levels of gas barrier and moisture barrier properties not obtained from conventional films. This is achieved by using a non-film-forming inorganic laminar compound having a particle size of 5 $\mu$m or less and an aspect ratio of 50–5,000 in a mixture of a high hydrogen-bonding resin and a non-film-forming inorganic laminar compound.

As stated in Examples which appear hereinafter, when the non-film-forming inorganic laminar compound is not contained, the barrier properties are greatly inferior to this invention even if the same resin is used (see, for example, Example 1 and Comparative Example 1). Even if the resin composition is composed of a high hydrogen-bonding resin and an inorganic laminar compound, when the inorganic laminar compound has an aspect ratio of about 30, the barrier properties are inferior 100 times or more to the Examples of this invention (see, for example, Comparative Example 3 and Example 1). In the Examples, the barrier properties are greatly different between the case of an aspect ratio of about 100 and the case of an aspect of about 500, and the barrier-imparting effect is greatly changed at an aspect ratio of about 200. When the aspect ratio is more than 200, a greater barrier-enhancing effect can be expected.

In the process for forming a film by adding to a resin or a resin solution a dispersion formed by swelling or cleaving a non-film-forming inorganic laminar compound with a solvent and removing the solvent, heat-ageing after the removal of the solvent (for example, at 150° C. for 10 minutes) greatly enhances the barrier properties of the film after water-resistant environmental test as compared with the case in which no heat-ageing is effected. This means that when the film is used in packaging foods, the package is resistant to high temperature and moisture conditions, boiling treatment or retort treatment, and the film is very much useful in practice.

Moreover, the addition of a cross-linking agent for the hydrogen-bonding group (ammonium zirconium carbonate is used in this case) greatly enhances the barrier properties of the film after water-resistant environmental test. When this is combined with the above-mentioned heat-ageing treatment, the effect is further increased, and the resulting film is more preferably used in packaging foods which may be subjected to high temperature and moisture conditions, boiling treatment or retort treatment.

The resin composition of this invention has so high level barrier properties as not to be predicted from conventional resin materials. The oxygen-permeability per $\mu$m of thickness of the film of this invention is not more than 2 cc/m$^2$/day/atm, or in some cases not more than 0.2 cc/m$^2$/day/atm, under the conditions that the temperature is 31° C. and the relative humidity is 61%, while even the ethylene-vinyl alcohol copolymer which has the best oxygen barrier properties among commercially available resins has an oxygen-permeability of 15 cc/m$^2$/day/atm. Further, the ethylene-vinylalcohol copolymer remarkably deteriorates in its gas barrier property at high humidity exceeding 90% RH. As shown in Comparative Examples 25 and 26, its oxygen-permeability per $\mu$m exceeds 90 cc/m$^2$/day/atm at a condition of 23.8° C., 94.5% RH. On the other hand, according to Examples 34–45, especially Example 45 of the present invention, oxygen-permeability per $\mu$m under the same condition as above is 0.06 cc/m$^2$/day/atm. This fact indicates that a film of the present invention has a very superior gas barrier property even at high humidity. The resin composition of this invention is greatly superior in barrier properties to conventional resins and is close to metal and ceramic in respect of barrier properties. Therefore, the resin composition can be used in uses requiring a metal such as aluminum foil or an inorganic material such as glass in view of gas barrier of the composition. Thus, the resin composition of this invention can be said to be a material which has broken down the common knowledge of gas barrier resin composition (such weak points of metal and ceramic that the former is opaque and the latter is brittle can be overcome by the resin composition of this invention).

That is to say, the resin composition of this invention can be used in the form of a film in packaging miso, sliced dried bonito, confectionery, noodle, ham, sausage, boiled rice, curry, stew and the like; in the form of a bottle as a squeeze bottle for mayonnaise or a container for juice, soy source, source, edible oil and the like; and can further be used for packaging industrial materials in medical, electronic, chemical and mechanical fields such as blood transfusion pack, semiconductor package, oxidative chemicals package, precision parts package and the like. Thus, the resin composition of this invention can be used in various forms in a wide field.

This invention is explained in more detail below referring to Examples; however, this invention is not limited to these Examples.

Various physical properties were measured by the following methods.

[Oxygen-permeability]

Measured by an oxygen-permeability measuring apparatus (OX-TRAN 10/50A manufactured by MOCON) at a temperature of 31° C. (moisture-controlling constant temperature bath: 21° C.) (the relative humidity was 61%).

[Thickness]

Measured by means of a digital thickness meter when the thickness is 0.5 $\mu$m or more or by means of a gravimetric analysis (the measured weight of a film having a unit area is divided by the area and then divided by the specific density of the composition) when the thickness is less than 0.5 $\mu$m, or by an elemental analysis in the case of a laminate of the resin composition of this invention to a substrate (the ratio of the thickness of the resin composition layer to the thickness of the substrate is determined from the ratio of the analysis value of the specific inorganic element (resulting from the composition layer) of the laminate to the analysis value of the specific element of inorganic laminar compound alone.

[Particle size]

Measured by an ultrafine particle size analyzer (BI-90 manufactured by Brookheven) at a temperature of 25° C. in an aqueous solvent. The center diameter determined from the photon correlation method according to a dynamic light-scattering method is taken as particle size L.

[Aspect ratio calculation]

Using an X-ray diffractometry (XD-5A manufactured by Shimadz Seisakusho), the inorganic laminar compound alone and the resin composition were subjected to diffraction measurement by a powder method to determine the spacing a (unit thickness) of the inorganic laminar compound, and it was confirmed from the diffraction measurement of the resin composition that there was a portion in which the spacing of the inorganic laminar compound was broadened. Using the particle size L determined by the above-mentioned method, the aspect ratio Z was determined from the equation Z=L/a.

EXAMPLE 1

Synthetic mica [terasililic mica (Na-Ts) manufactured by Topy Kogyo] was dispersed in ion-exchanged water (0.7 $\mu$S/cm or less) in a proportion of 0.65 % by weight. This dispersion is used hereinafter as a non-film-forming inorganic laminar compound dispersion (Liquid A). The particle size of the synthetic mica (Na-Ts) was 977 nm, and the a value obtained from the powder X-ray diffraction was 0.9557 nm, and the aspect ratio Z was 1043. Polyvinyl alcohol (PVA 210 manufactured by Kurarey, saponification degree: 88.5%, polymerization degree: 1,000) was dissolved in deionized water (0.7 $\mu$S/cm or less) in a concentration of 0.325% by weight. The resulting solution is used hereinafter as a high hydrogen-bonding resin solution (Liquid B). Liquid A and Liquid B were mixed so that the solid component ratio (volume ratio) [non-film-forming inorganic laminar compound/high hydrogen-bonding resin] was 3/7. The resulting mixture is used hereinafter as a coating solution. The coating solution was applied onto a substrate obtained by subjecting a triacetylcellulose (TAC) film (FUJITAC CLEAR manufactured by Fuji Photo Film Co., Ltd.) having a thickness of 76 $\mu$m to surface saponification treatment, and then dried at room temperature to obtain a gas barrier film. The dry thickness of the coating layer was 0.87 $\mu$m. The oxygen-permeability of the resulting laminated film at 31° C. and 61% RH was 0.092 cc/m$^2$/day. This value was reduced to that in the case where the dry coating thickness was 1.0 $\mu$m to obtain an oxygen-permeability at 31° C. and 61% RH of 0.08 cc/m$^2$/day. Hence, the laminated film was excellent in gas barrier properties.

EXAMPLE 2

The same procedure as in Example 1 was repeated, except that the high hydrogen-bonding resin of Liquid B was replaced with hydroxyethylcellulose (manufactured by Wako Junyaku Kogyo) to obtain a gas barrier film, which was then subjected to oxygen-permeability test. The result obtained is indicated in Table 1 which shows excellent gas barrier properties.

EXAMPLE 3

The same procedure as in Example 1 was repeated, except that the coating and drying were conducted using a direct gravure coater (Multicoater M-200 manufactured by Hirano Tech-Seed) by a direct gravure coating method (coating speed: 1.7 m/min, drying temperature: 80° C., repeatedly coated 4 times) to obtain a gas barrier film, which was then subjected to oxygen-permeability test. The result obtained is shown in Table 1 which indicates excellent gas barrier properties.

EXAMPLE 4

The same procedure as in Example 1 was repeated, except that a direct gravure coater (Multicoater M-200 manufactured by Hirano Tech-Seed) by a direct gravure coating method (coating speed: 1.7 m/minute, drying temperature: 80° C., repeatedly coated 4 times) and the substrate was replaced with a biaxially oriented polystyrene (OPS) film having a thickness of 25 $\mu$m [TYPE(TH)CO, corona-treated, manufactured by Asahi Chemical Industry Co., Ltd.) to obtain a gas barrier film, which was then subjected to oxygen-permeability test. The result obtained is shown in Table 1 which indicates excellent gas barrier properties.

COMPARATIVE EXAMPLE 1

The same procedure as in Example 1 was repeated, except that Liquid A was not used and a 1% by weight solution of polyvinyl alcohol (PVA 210 manufactured by Kurarey, saponification degree: 88.55%, polymerization degree: 1,000) in deionized water (0.7 μS/cm or less) was substituted for the Liquid B, to obtain a film, which was then subjected to oxygen-permeability test. The result obtained is shown in Table 1 which indicates inferior gas barrier properties.

COMPARATIVE EXAMPLE 2

The same procedure as in Example 1 was repeated, except that Liquid A was not used and a 2% by weight solution of hydroxyethylcellulose (HEC manufactured by Wako Junyaku Kogyo) in deionized water (0.7 μS/cm or less) was substituted for the Liquid B, to obtain a film, which was then subjected to oxygen-permeability test. The result obtained is shown in Table 1 which indicates inferior gas barrier properties.

COMPARATIVE EXAMPLE 3

The same procedure as in Example 1 was repeated, except that the Liquid A was replaced with a dispersion obtained by dispersing synthetic hectorite [Laponite XLG manufactured by Nihon Silica Kogyo, particle size: 35 nm, a value: about 1 nm (diffraction peak was broad), aspect ratio: about 35] in deionized water (0.7 μS/cm or less) in a proportion of 2% by weight and the Liquid B was replaced with a 1% by weight solution of polyvinyl alcohol (PVA 210 manufactured by Kurarey, saponification degree: 88.5%, polymerization degree: 1,000) in deionized water (0.7 μS/cm or less), to obtain a film, which was then subjected to oxygen-permeability test. The result obtained is shown in Table 1 which indicates inferior gas barrier properties.

COMPARATIVE EXAMPLE 4

The same procedure as in Example 1 was repeated, except that Liquid B was not used, to prepare a film. However, the synthetic mica was peeled off from the laminated film and flaws showed horribly on the film surface, and the film-formability was inferior.

COMPARATIVE EXAMPLE 5

Triacetylcellulose (TAC) film (thickens: 76 μm, FUJITAC CLEAR manufactured by Fuji Photo Film Co., Ltd.) had an oxygen-permeability at 61% RH as shown in Table 1 which indicates greatly inferior gas barrier properties.

COMPARATIVE EXAMPLE 6

A biaxially oriented polystyrene (OPS) film having a thickness of 25 μm [TYPE(TH)CO, corona-treated, manufactured by Asahi Chemical Industry Co., Ltd.] had an oxygen-permeability at 31° C. and 61% RH as shown in Table 1 which indicates greatly inferior gas barrier properties.

EXAMPLES 5–15

The oxygen-permeabilities of films each composed of the non-film-forming inorganic laminar compound, high hydrogen-bonding resin and substrate shown in Table 2 in the proportions shown in Table 2 were measured. Each of the films was formed by coating on the substrate a coating solution consisting of Liquid A and Liquid B prepared in the same manner as in Example 1, except that both Liquids A and B had a concentration of 2% by weight, by a gravure coater (Testcoater NCR 3-230, CAG 150, CR3 manufactured by Yasui Seiki) by a microgravure coating method [coating speed: 1–3 m/minute, drying temperature: 60° C. (inlet heater) and 100° C. (outlet heater)]

The results obtained are shown in Table 2 which indicates excellent gas barrier properties.

COMPARATIVE EXAMPLES 7–13

The oxygen-permeabilities of films each composed of the inorganic laminar compound, resin and substrate shown in Table 2 in the proportions shown in Table 2 prepared in the same manner as in Examples 1–15 and the oxygen-permeability of the substrate alone were measured. The results obtained are shown in Table 2 which indicates inferior gas barrier properties.

EXAMPLES 16–25

Films each composed of the non-film-forming inorganic laminar compound, high hydrogen-bonding resin and substrate shown in Table 3 in the proportions shown in Table 3 which had been subjected to heat treatment after film-formation under the conditions shown in Table 3 were subjected to oxygen-permeability test before and after immersion in hot water. The films were prepared by coating the substrate with a coating solution prepared in the same manner as in Example 1, except that the concentrations of Liquids A and B were 2% by weight and a cross-linking agent for hydrogen-bonding group was added after the preparation of the coating solution consisting of Liquids A and B, by means of a gravure coater (Testcoater NCR 3-230, CAG 150, CR3 manufactured by Yasui Seiki) by a microgravure coating method [coating speed: 1–3 m/minute, drying temperature: 60° C. (inlet heater) and 100° C. (outlet heater)]. The heat treatment after film-formation was conducted by subjecting the films to treatment by a hot air dryer (Perfect Oven manufactured by Tabai Esupekku) at the predetermined temperature for the predetermined time. The oxygen-permeability test after immersion in hot water was conducted as follows: The sample was immersed in water at 60° C. for 13 hours, air dried, dried at 60° C. for 1 hour and then subjected to oxygen-permeability test.

The results obtained are shown in Table 3 which indicates excellent gas barrier properties. The films which had been heat-treated or films in which a cross-linking agent for the hydrogen-bonding group was used indicate remarkable enhancement of water resistance.

COMPARATIVE EXAMPLES 14–15

The oxygen-permeability test after immersion in hot water was conducted of films each composed of the inorganic laminar compound, resin, substrate and cross-linking agent shown in Table 3 in the proportions shown in Table 3, the films having been prepared by the same manner as in Examples 16–25 and heat-treated under the conditions shown in Table 3. The results obtained are shown in Table 3, which indicates inferior gas barrier properties and inferior water resistance.

EXAMPLES 26–33

Films each composed of the inorganic laminar compound, resin and cross-linking agent shown in Table 4 in the proportions shown in Table 4 which had been subjected to heat treatment after film-formation under the conditions shown in Table 4 were subjected to dissolution resistance test. The films were prepared by casting a coating solution prepared in the same manner as in Example 1, except that the concentrations of Liquids A and B were 2% by weight and the cross-linking agent was added after the preparation of the coating solution consisting of Liquids A and B, on an acrylic resin plate so that the film thickness after drying became about 20 μm, and drying the resulting films at room temperature. The dissolution resistance test was conducted as follows: The film sample obtained was subjected to heat-treatment by a hot air dryer (Perfect Oven manufactured by Tabai Esupekku) at the predetermined temperature for the predetermined time, wrapped with a stainless steel net, immersed in hot water at 80° C. for 10 minutes, taken out together with the stainless steel net, air-dried and then air-dried at 60° C. for 1 hour, after which the weight percentage of the remainder was determined (the higher the percentage of remainder, the better the water resistance). The results obtained are shown in Table 4 which indicates excellent water resistance.

COMPARATIVE EXAMPLES 16–24

Dissolution resistance test was conducted of films each composed of the inorganic laminar compound, resin and cross-linking agent shown in Table 4 in the proportions shown in Table 4 prepared in the same manner as in Examples 26–33. The results obtained are shown in Table 4 which indicates inferior water resistance. In particular, in Comparative Example 19, coloration was violent; in Comparative Examples 21–23, deformation of film was violent; and in each case, the appearance was inferior.

EXAMPLES 34–45

Oxygen-permeability test was conducted in the same manner as in Examples 16–25, except that the test was conducted at high humidity. The results obtained are shown in Table 5 which indicate superior gas barrier property.

COMPARATIVE EXAMPLES 25 AND 26

Oxygen-permeability test was conducted at high humidity as in Examples 34–45 by using an ethylene-vinyl alcohol copolymer film (trade name: Eval EF-F, manufactured by Kuraray Co., Ltd., film thickness 15 gm) which is a commercially available barrier film. The results obtained are shown in Table 5 which indicate inferior gas barrier property.

COMPARATIVE EXAMPLES 27–29

A coated film solely composed of the inorganic laminar compound was laminated and the oxygen-permeability test was conducted in the same manner as in Comparative Example 4, except that a biaxially oriented polypropylene film (opp20) was used as the substrate, inorganic laminar compounds shown in Table 6 were used, and a concentration of the inorganic laminar compound dispersion (Liquid A) was 2% by weight.

All the results obtained indicate inferior gas barrier property and inferior film-formability.

TABLE 1

| | Substrate | Kind of resin (C) | Resin composition Kind of inorganic laminar compound (D) | Volume ratio D/C | Film thickness (nm) | Oxygen-permeability ($cc/m^2/day/atm$) Measurement conditions | Value found | Reduced value (composition thickness: 1 μm) | Remarks (appearance etc.) |
|---|---|---|---|---|---|---|---|---|---|
| Example | | | | | | | | | |
| 1 | TAC76 | PVA210 | NaTs | 3/7 | 870 | 31° C., 61% RH | 0.092 | 0.08 | |
| 2 | TAC76 | HEC | NaTs | 3/7 | 10000 | 31° C., 16% RH | 0.185 | 1.85 | |
| 3 | TAC76 | PVA210 | NaTs | 3/7 | 28.4 | 31° C., 61% RH | 5.94 | 0.16 | |
| 4 | OPS25 | PAV210 | NaTs | 3/7 | 24.3 | 31° C., 61% RH | 2.13 | 0.05 | |
| Comp. Ex. | | | | | | | | | |
| 1 | TAC76 | PVA210 | — | 0/10 | 2000 | 31° C., 61% RH | 240.6 | 481.2 | |
| 2 | TAC76 | HEC | — | 0/10 | 10000 | 31° C., 61% RH | 1829 | 18290 | |
| 3 | TAC76 | PVA210 | Laponite | 3/7 | 3200 | 31° C., 61% RH | 4.72 | 15.1 | |
| 4 | TAC76 | — | NaTs | 10/0 | — | 31° C., 61% RH | — | — | No film-formability |
| 5 | TAC76 | — | — | — | — | 31° C., 61% RH | 833.3 | — | Substrate film |
| 6 | OPS25 | — | — | — | — | 31° C., 61% RH | 10284 | — | Substrate film |

TABLE 2

| | Substrate | Kind of resin (C) | Resin composition Kind of inorganic laminar compound (D) | Volume ratio D/C | Film thickness (nm) | Oxygen-permeability ($cc/m^2/day/atm$) Measurement conditions | Value found | Reduced value (composition thickness: 1 μm) | Remarks (appearance etc.) |
|---|---|---|---|---|---|---|---|---|---|
| Example | | | | | | | | | |
| 5 | OPET25 | PVA117H | Kunipia F | 1/9 | 348 | 31° C., 61% RH | 0.17 | 0.06 | |
| 6 | OPET25 | PVA117H | " | 2/8 | 554 | 31° C., 61% RH | 0.05 | 0.027 | |
| 7 | OPET25 | PVA117H | " | 3/7 | 587 | 31° C., 61% RH | <0.05 | <0.029 | |

TABLE 2-continued

| | Substrate | Resin composition Kind of resin (C) | Kind of inorganic laminar compound (D) | Volume ratio D/C | Film thickness (nm) | Oxygen-permeability (cc/m²/day/atm) Measurement conditions | Value found | Reduced value (composition thickness: 1 μm) | Remarks (appearance etc.) |
|---|---|---|---|---|---|---|---|---|---|
| 8 | OPET25 | PVA117H | " | 5/5 | 594 | 31° C., 61% RH | 0.05 | 0.029 | |
| 9 | OPET25 | PVA110 | Smecton SA | 3/7 | 440 | 23° C., 78% RH | 2.88 | 1.26 | |
| 10 | OPET25 | PVA110 | NaTs | 3/7 | 120 | 23° C., 78% RH | 0.92 | 0.11 | |
| 11 | OPET12 | PVA103 | Smecton SA | 2/8 | 375 | 31° C., 61% RH | 1.32 | 0.495 | |
| 12 | OPET12 | PVA103 | Kunipia F | 2/8 | 335 | 31° C., 61% RH | 0.20 | 0.067 | |
| 13 | ONy15 | PVA117H | " | 3/7 | 769 | 31° C., 61% RH | <0.05 | <0.038 | |
| 14 | OPP20 | PVA117H | " | 2/8 | 506 | 31° C., 61% RH | 0.06 | 0.03 | |
| 15 | OPET12 | PVA124 | " | 2/8 | 525 | 31° C., 61% RH | 0.24 | 0.13 | |
| Com. Ex. | | | | | | | | | |
| 7 | OPET25 | PVA110 | — | — | 520 | 23° C., 78% RH | 11.69 | 6.07 | |
| 8 | OPET12 | PVA103 | Laponite | 2/8 | 362 | 31° C., 61% RH | 4.48 | 3.62 | |
| 9 | ONy15 | PVA117H | — | — | 1450 | 31° C., 61% RH | 2.74 | 3.97 | |
| 10 | OPET12 | PVA124 | — | — | 1104 | 31° C., 61% RH | 2.12 | 2.34 | |
| 11 | OPET12 | — | — | — | — | 31° C., 61% RH | 155.6 | — | Substrate film |
| 12 | ONy15 | — | — | — | — | 31° C., 61% RH | 50.6 | — | Substrate film |
| 13 | OPP20 | — | — | — | — | 20° C., 0% RH | 1500 | — | Substrate film |

TABLE 3

| | Substrate | Resin composition Kind of resin (C) | Kind of inorganic laminar compound (D) | Volume ratio D/C | Film thickness (nm) | Crosslinking | Heat-treating conditions | Hot-water immersion conditions | Oxygen-permeability (cc/m²/day/atm) Conditions | Value found |
|---|---|---|---|---|---|---|---|---|---|---|
| Example | | | | | | | | | | |
| 16 | OPET25 | PVA117H | NaTs | 3/7 | 382 | — | — | — | 31° C., 61% RH | 0.09 |
| 17 | OPET25 | PVA117H | NaTs | 3/7 | 382 | — | — | 60° C., 13 hr | 31° C., 61% RH | 8.25 |
| 18 | OPET25 | PVA117H | NaTs | 3/7 | 382 | — | 100° C., 10 min | 60° C., 13 hr | 31° C., 61% RH | 6.47 |
| 19 | OPET25 | PAV117H | NaTs | 3/7 | 382 | — | 150° C., 10 min | 60° C., 13 hr | 31° C., 61% RH | 0.46 |
| 20 | OPET25 | PVA117H | NaTs | 3/7 | 382 | — | 180° C., 10 min | 60° C., 13 hr | 31° C., 61% RH | 0.37 |
| 21 | OPET25 | PVA117H | NaTs | 3/7 | 572 | AZC | — | — | 31° C., 61% RH | <0.05 |
| 22 | OPET25 | PVA117H | NaTs | 3/7 | 572 | AZC | — | 60° C., 13 hr | 31° C., 61% RH | 0.28 |
| 23 | OPET25 | PVA117H | NaTs | 3/7 | 572 | AZC | 100° C., 10 min | 60° C., 13 hr | 31° C., 61% RH | 0.09 |
| 24 | OPET25 | PVA117H | NaTs | 3/7 | 572 | AZC | 150° C., 10 min | 60° C., 13 hr | 31° C., 61% RH | 0.05 |
| 25 | OPET25 | PAV117H | NaTs | 3/7 | 572 | AZC | 180° C., 10 min | 60° C., 13 hr | 31° C., 61% RH | <0.05 |
| Comp. Ex. | | | | | | | | | | |
| 14 | OPET25 | PVA117H | — | 0/10 | 263 | — | — | 60° C., 13 hr | 31° C., 61% RH | 63.06 |
| 15 | OPET25 | PVA117H | — | 0/10 | 263 | — | 180° C., 10 min | 60° C., 13 hr | 31° C., 61% RH | 32.82 |

TABLE 4

| | Kind of resin (C) | Resin composition Kind of inorganic laminar compound (D) | Volume ratio D/C | Crosslinking agent | Film thickness (μm) | Heat-treating conditions | Dissolution resistance test (Hot water immersion: 80° C., 10 min) Weight percentage of remainder (wt %) | Remarks (Appearance, etc.) |
|---|---|---|---|---|---|---|---|---|
| Example | | | | | | | | |
| 26 | PVA117H | Kunipia F | 3/7 | — | 20 | 80° C., 10 min | 80.0 | |
| 27 | PVA117H | " | 3/7 | — | 20 | 100° C., 10 min | 80.4 | |
| 28 | PVA117H | " | 3/7 | — | 20 | 150° C., 10 min | 92.1 | |
| 29 | PAV117H | " | 3/7 | — | 20 | 180° C., 10 min | 96.6 | |
| 30 | PVA117H | " | 3/7 | AZC | 20 | 80° C., 10 min | 91.9 | |
| 31 | PVA117H | " | 3/7 | AZC | 20 | 100° C., 10.min | 93.7 | |

TABLE 4-continued

| | | Resin composition | | | | Dissolution resistance test (Hot water immersion: 80° C., 10 min) | | |
|---|---|---|---|---|---|---|---|---|
| | Kind of resin (C) | Kind of inorganic laminar compound (D) | Volume ratio D/C | Crosslinking agent | Film thickness (μm) | Heat-treating conditions | Weight percentage of remainder (wt %) | Remarks (Appearance, etc.) |
| 32 | PVA117H | " | 3/7 | AZC | 20 | 150° C., 10 min | 98.7 | |
| 33 | PVA117H | " | 3/7 | AZC | 20 | 180° C., 10 min | 100 | |
| Comp. Ex. | | | | | | | | |
| 16 | PVA117H | — | 0/10 | — | 20 | — | 0 (Completely dissolved) | |
| 17 | PVA117H | — | 0/10 | — | 20 | 80° C., 10 min | 0 (Completely dissolved) | |
| 18 | PVA117H | — | 0/10 | — | 20 | 100° C., 10 min | 0 (Completely dissolved) | |
| 19 | PAV117H | — | 0/10 | — | 20 | 150° C., 10 min | 0 (Completely dissolved) | |
| 20 | PVA117H | — | 0/10 | — | 20 | 180° C., 10 min | 81.3 | Brown, large deformation |
| 21 | PVA117H | — | 0/10 | AZC | 20 | 80° C., 10 min | 77.6 | |
| 22 | PVA117H | — | 0/10 | AZC | 20 | 100° C., 10 min | 88.1 | Large deformation |
| 23 | PVA117H | — | 0/10 | AZC | 20 | 150° C., 10 min | 97.9 | Large deformation |
| 24 | PVA117H | — | 0/10 | AZC | 20 | 180° C., 10 min | 96.5 | Large deformation |

Note to Tables 1 to 4:
Substrate
TAC76: Triacetylcellulose (trade name: FUJITAC CLEAR, manufactured by Fuji Photo Film Co., Ltd.), surface-saponified product, film thickness: 76 μm
OPS25: Biaxially oriented polystyrene film (trade name: Styrofilm (TH)CO, manufactured by Asahi Chemical Industry Co., Ltd.), corona-treated on one side, film thickness: 25 μm
OPET25: Biaxially oriented polyethylene terephthalate film (trade name: Lumilar, manufactured by Toray Industries, Inc.), corona-treated on one side, film thickness: 25 μm
OPET12: Biaxially oriented polyethylene terephthalate film (trade name: Lumilar, manufactured by Toray Industries, Inc.), corona-treated on one side, film thickness: 12 μm
ONy15: Biaxially oriented nylon film (trade name: Emblem ON, manufactured by Unitika Ltd.), corona-treated on one side, film thickness: 15 μm
OPP20: Biaxially oriented polypropylene film (trade name: Pyren Film-OT, manufactured by Toyobo Co., Ltd.), corona-treated on one side, film thickness: 20 μm
Resin
PVA210: Polyvinyl alcohol (trade name: Poval 210, manufactured by Kuraray Co., Ltd.), saponification degree: 88.5 mole %, polymerization degree: 1,000
HEC: Hydroxyethylcellulose (manufactured by Wako Junyaku Kogyo)
PVA117H: Polyvinyl alcohol (trade name: Poval 117H, manufactured by Kuraray Co., Ltd.), saponification degree: 99.6 mole %, polymerization degree: 1,700
PVA110: Polyvinyl alcohol (trade name: Poval 110, manufactured by Kuraray Co., Ltd.), saponification degree: 98.5%, polymerization degree: 1,000
PVA103: Polyvinyl alcohol (trade name: Poval 103, manufactured by Kuraray Co., Ltd.), saponification degree: 98.5%, polymerization degree: 300
PVA124: Polyvinyl alcohol (trade name: Poval 124, manufactured by Kurarey), saponification degree: 98.5%, polymerization degree: 2,400
Inorganic laminar compound
NaTs: Synthetic tetrasililic mica (trade name: NaTs, manufactured by Topy Kogyo), particle size: 977 nm, a value: 0.9557 nm, aspect ratio: 1043
Laponite: Synthetic hectorite (trade name: Laponite XLG, manufactured by Nippon Silica Kogyo), particle size: 35 nm, a value: about 1 nm (diffraction peak: broad), aspect ratio: about 35
KunipiaF: High purity montmorillonite (trade name: KunipiaF, manufactured by Kunimine Kogyo), particle size: 560 nm, a value: 1.2156 nm, aspect ratio: 461
SmectonSA: Synthetic saponite (trade name: SmectonSA, manufactured by Kunimine Kogyo), particle size: 108 nm, a value: about 1 nm (diffraction peak: broad), aspect ratio: about 108
Cross-linking agent
AZC: Ammonium zirconium carbonate (trade name: ZircosolAC-7, manufactured by Daiichi Kigenso Kogyo), aqueous solution containing 15% by weight of zirconium oxide, added so that the amount of hydrogen-bonding group in the resin became 15 moles per mole of zirconium element.

TABLE 5

| | | | Oxygen-permeability (cc/m²/day/atm) | | |
|---|---|---|---|---|---|
| | Sample | Heat-treating conditions | Measurement conditions | Value found | Reduced value per μm |
| Example | | | | | |
| 34 | Example 16 | — | 23.9° C., 90.8% RH | 0.37 | 0.14 |
| 35 | " | 150° C., 10 min | " | 0.41 | 0.16 |
| 36 | " | 180° C., 10 min | " | 0.21 | 0.10 |
| 37 | Example 21 | — | " | 0.36 | 0.20 |
| 38 | " | 150° C., 10 min | " | 0.13 | 0.07 |

TABLE 5-continued

| | Sample | Heat-treating conditions | Oxygen-permeability (cc/m²/day/atm) | | |
| | | | Measurement conditions | Value found | Reduced value per μm |
|---|---|---|---|---|---|
| 39 | " | 180° C., 10 min | " | 0.10 | 0.06 |
| 40 | Example 16 | — | 23.8° C., 94.5% RH | 1.01 | 0.38 |
| 41 | " | 150° C., 10 min | " | 0.80 | 0.30 |
| 42 | " | 180° C., 10 min | " | 0.66 | 0.25 |
| 43 | Example 21 | — | " | 0.65 | 0.37 |
| 44 | " | 150° C., 10 min | " | 0.18 | 0.10 |
| 45 | " | 180° C., 10 min | " | 0.11 | 0.06 |
| Comp. Ex. | | | | | |
| 25 | EVOH-F | — | 23.9° C., 90.8% RH | 5.0 | 75 |
| 26 | " | — | 23.8° C., 94.5% RH | 6.5 | 97.5 |

EVOH-F: Ethylene-vinylalcohol copolymer (trade name, Eval-EF-F, mfd. by Kuraray Co., Ltd.; thickness 15 μm)

TABLE 6

| | Kind of inorganic laminar compound [Thickness of the dried layer] | Oxygen-permeability | | Remarks (appearance, etc.) |
| | | Value found (cc/m²/day/atm) | Product of Thickness of the dried layer and Value found (cc.μm/m²/day/atm) | |
|---|---|---|---|---|
| Comp. Ex. 27 | NaTs [5 μm] | 2000 | 1000 | Blanching |
| Ex. 28 | Kunipia F [7 μm] | 550 | 3850 | Blanching |
| Ex. 29 | Smecton SA [20 μm] | 1050 | 21000 | A little opaque white |

What is claimed is:

1. A process for producing a resin composition or its film, said process comprising:

swelling or cleaving a non-film-forming inorganic laminar compound with a solvent to form dispersion;

mixing a resin or resin solution with the dispersion and thereby dispersing the non-film-forming inorganic laminar compound in the resin or resin solution; and removing the solvent from the dispersion, if necessary in the form of a film, while maintaining the non-film-forming inorganic laminar compound in the swollen or cloven state.

2. The process according to claim 1, wherein the resin composition or film is subjected, after the removal of solvent, to heat-ageing further comprising heat-aging the resin composition or its film at a temperature of 110° C. to 220° C., wherein said heat-aging step is performed after said removing step.

3. The process according to claim 1, wherein the resin or resin solution contains a high hydrogen-bonding resin and a cross-linking agent reactive with a hydrogen bonding group of the hydrogen bonding resin, said process further comprising heat-aging the resin composition or film at a temperature of 110° C. to 220° C., wherein said heat-aging step is performed after said removing step.

4. The process according to claim 1, wherein the resin or resin solution comprises a high hydrogen-bonding resin and a zirconia compound as a cross-linking agent reactive with a hydrogen group of the hydrogen-bonding resin, said process further comprising heat-aging the resin composition or film at a temperature of 110° C. to 220° C., wherein said heat-aging step is performed after said removing step.

* * * * *

UNITED STATES PATENT AND TRADEMARK OFFICE
CERTIFICATE OF CORRECTION

PATENT NO. : 5,969,029
DATED : October 19, 1999
INVENTOR(S) : Kotani et al.

It is certified that error appears in the above-identified patent and that said Letters Patent is hereby corrected as shown below:

On the title page: Item [75]

Line 2, after "Kawakita" (first occurrence) insert --, of Ibaraki--; change "Kawakita," (second occurrence) to --Sakaya;--; delete "both of";

Line 3, delete "Ibaraki;"; before "Takatsuki" insert --both of--.

On the cover page, item [60], delete lines 1-5 and insert the following:

--Division of application No. 08/416,380, Apr. 4, 1995, Pat. No. 5,700,560, which is a continuation-in-part of application No. 08/384,798, Feb. 6, 1995, abandoned, which is a continuation of application No. 08/097,889, Jul. 28, 1993, abandoned.--

Signed and Sealed this

Fifth Day of September, 2000

Attest:

Attesting Officer

Q. TODD DICKINSON
Director of Patents and Trademarks